(12) United States Patent
Kim et al.

(10) Patent No.: US 7,233,379 B2
(45) Date of Patent: Jun. 19, 2007

(54) PIXEL STRUCTURE OF LIQUID CRYSTAL DISPLAY

(75) Inventors: Dae Hong Kim, Gumi-si (KR); Jong Seo Yoon, Seoul (KR); Ki Cheol Seo, Daegu-si (KR); Hyun Jin Park, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 227 days.

(21) Appl. No.: 10/725,030

(22) Filed: Dec. 2, 2003

(65) Prior Publication Data

US 2004/0109118 A1    Jun. 10, 2004

(30) Foreign Application Priority Data

Dec. 2, 2002    (KR)    ............ 10-2002-0075890

(51) Int. Cl.
*G02F 1/1343*    (2006.01)
(52) U.S. Cl. ........................... 349/139; 349/43
(58) Field of Classification Search ............ 349/43, 349/139
See application file for complete search history.

(56) References Cited

U.S. PATENT DOCUMENTS 6,882,376 B2 *   4/2005   Kim et al. .................... 349/43

* cited by examiner

*Primary Examiner*—David Nelms
*Assistant Examiner*—David Y. Chung
(74) *Attorney, Agent, or Firm*—McKenna Long & Aldridge LLP

(57) ABSTRACT

Disclosed is a pixel structure of a liquid crystal display including: a first substrate with red, green and blue color filters; a second substrate comprising; a TFT; a data bus line carrying a data signal that is applied to the TFT to drive unit pixels; and a gate bus line in which a bump-shaped groove is formed at a region where the gate bus line crosses and overlaps the data bus line to prevent the data bus line from opening and through which a gate signal is applied: wherein current is selectively supplied to the pixel electrode of the unit pixel region defined by the gate bus line and the data bus line so that an electric field is generated between the first substrate and the second substrate; and a liquid crystal layer between the first substrate and the second substrate.

7 Claims, 5 Drawing Sheets

PIXEL STRUCTURE OF LIQUID CRYSTAL DISPLAY

This application claims the benefit of Korean Patent Application No. 2002-75890, filed on 2 Dec. 2002, which is hereby incorporated by reference for all purposes as if fully set forth herein.

BACKGROUND OF THE INVENITON

1. Field of the Invention

The present invention relates to a liquid crystal display (LCD), and more particularly, to a pixel structure of a liquid crystal display that prevents data bus lines and drain electrodes overlapping gate bus lines and gate electrodes respectively on an array substrate from opening.

2. Description of the Related Art

As modern society becomes a more information-oriented society, LCDs become more and more important to display information. The cathode ray tube (CRT) that has been most widely used in the past has many advantages, e.g., in performance and price, but it also has a lot of disadvantages, e.g. in miniaturization and portability.

While an LCD may be more expensive than CRT or other displays, it has advantages such as miniaturization, low weight, a slim profile, and low power consumption to become an attractive substitute for the CRT display.

The LCD includes an array substrate on which thin film transistors are arranged, a color filter substrate on which red, green, blue color filter layers are formed and which is attached with the array substrate, and liquid crystal interposed therebetween.

The array substrate and the color filter substrate are formed by patterning and etching various layers by using a photolithography process. The array substrate may be fabricated as described below.

First, a metal layer is deposited on a transparent glass substrate and etched to form a gate bus line and a gate electrode (first masking step). After that, a gate insulating film, an amorphous silicon film and a doped amorphous silicon film are each coated on the glass substrate and etched to form a channel layer (second masking step). Next, a source/drain metal film is deposited on the glass substrate by which the channel layer is formed, and etched to form source/drain electrodes and a data bus line (third masking step). Afterwards, a passivation film for protecting the previously formed elements is deposited on the glass substrate and a contact hole is formed in the passivation film (fourth masking step). Thereafter, an indium-tin-oxide (ITO) transparent metal film is deposited on the substrate on which the passivation film is formed, and etched to form a pixel electrode (fifth masking step).

In general, five to eight masking processes are used in manufacturing an array substrate. Then, because increasing the number of masking steps causes the manufacturing cost to increase, recent research has lead to a reduction in the number of the masking steps in the LCD manufacturing process, so that a process in which a channel layer and source/drain electrodes are formed simultaneously results in four masking steps, and this process is now widely being employed.

To successfully perform the four masking step process described above, a photo resist film is patterned in half tone and etched using a half tone mask to simultaneously form a source electrode, a drain electrode, and an active layer region. In another method, when patterning a photo resist film, the photo resist film is exposed using a mask with a slit pattern having a resolution less than a normal resolution.

In four or five masking processes, a gate bus line and a data bus line formed on the array substrate are perpendicularly crossed and overlap each other. Here, a predetermined stepped portion is generated at the overlapped region due to the overlapped gate bus line.

Because this stepped portion may cause the data bus line and the source and drain electrodes to open in manufacturing the array substrate, pixel structures generated by various methods to prevent such an opening are being studied.

FIG. 1 is a plan view of the structure of an array substrate of an LCD according to the related art.

Referring to FIG. 1, a plurality of gate bus lines 1a and 1b and a plurality of data bus lines 3a and 3b cross substantially perpendicularly with each other to form a unit pixel region.

Thin film transistors (TFTs) which are a switching element are formed and arranged where the gate bus lines 1a and 1b and the data bus lines 3a and 3b intersect. Pixel electrodes 9a and 9b made of transparent ITO are arranged on unit pixel regions.

The gate bus lines 1a and 1b and the data bus lines 3a and 3b are arranged to overlap each other. A gate insulating film and an active layer 7 are interposed between the two lines. The data bus line 3a, a source electrode 6a, and a drain electrode 6b are arranged on the active layer 7.

The active layer 7 is formed of amorphous silicon layer and $n^+$ amorphous silicon layer. In the TFT formation, the active layer 7 is formed as a channel layer and an ohmic contact layer.

A passivation film is formed on the data bus line 3a, the source electrode 6a and the drain electrode 6b so that the passivation film protects the elements formed on the array substrate. To connect the pixel electrodes 9a and 9b with the drain electrode 6b, contact holes are formed in the passivation film. Drain electrodes 6b are respectively connected to the pixel electrodes 9a and 9b through the contact holes.

The array substrate shown in FIG. 1 has a structure in which the active layer 7 is exposed by a predetermined width on both sides of the data bus lines 3a and 3b. The structure is formed by the four masking step process in which the source/drain electrodes and the channel layer are formed simultaneously.

Because the gate bus lines 1a and 1b and a gate electrode 5 arranged on the array substrate overlap the data bus lines 3a and 3b and the drain electrode 6b with the active layer 7 interposed therebetween, a stepped portion is formed at the boundary portion of the overlapped area.

This stepped portion of the overlap area may cause the data bus lines 3a and 3b to open or the drain electrode 6b to open. To prevent such an opening, a predetermined groove is formed on the gate bus lines 1a and 1b at a boundary area where the gate bus lines 1a and 1b overlap the data bus lines 3a and 3b.

FIG. 2 is an enlarged view of the cross region (A) of the data bus line and the gate bus line shown in FIG. 1.

As shown in FIG. 2, a TFT is arranged on the area at which the data bus line 3a and the gate bus line 1a cross each other. The gate bus line 1a to which a driving signal is applied and the gate electrode 5 of the TFT are integrally formed and arranged.

The gate insulating film 4 (see FIG. 3) and an active layer 7 are formed on the gate electrode 5. The source electrode 6a and the drain electrode 6b overlap a predetermined portion of the gate electrode 5 on the active layer 7.

When the drain electrode 6b overlaps the gate electrode 5 and is contacted with the pixel electrode 9a, a stepped portion is formed due to the gate electrode 5 positioned at the lower portion of the drain electrode 6*b*.

Likewise, a stepped portion is formed in the region where the gate bus line 1*a* and the data bus line 3*a* intersect with the gate insulating film 4 and the active layer 7 interposed therebetween.

As shown in the drawing, the reason why a groove 8 is formed in the region where the gate bus line 1*a* overlaps the data bus line 3*a* is to minimize the stepped portion of the gate bus line and thereby to prevent the data bus line 3*a* from opening. In other words, by forming a groove 8 in the gate bus line 1*a*, when a metal film is deposited to form the data bus line 3*a* overlapping the gate bus line 1*a*, the groove formed on the gate bus line 1*a* reduces the size of the stepped portion so that the metal film is deposited smoothly. However, in the pixel structure of the liquid crystal display, although the groove 8 is formed in the gate bus line, the data bus line may be opened due the stepped portion in the area where the data bus line 3*a* overlaps the gate bus line 1*a*.

In addition, because the array substrate formed in the four masking step process has a lower active layer whose width is wider than the width of the source electrode 6*a*, the drain electrode 6*b*, and the data bus line 3*a*, penetration of etchant and pattern defects are caused, and thus the drain electrode 6*b* and data bus line 3*a* may be opened.

FIG. 3 is a cross-sectional view taken along the line B–B' of FIG. 2.

As shown in FIG. 3, a gate bus line 1*a* is formed on a transparent insulating substrate 10. A gate insulating film 4 and an active layer 7 are sequentially deposited on the gate bus line 1*a*.

The data bus line 3*a* is arranged along the active layer 7. The data bus line 3*a* has a predetermined stepped portion due to the gate bus line 1*a*, a stacked gate insulating film 4, and the active layer 7.

The cross-sectional structure is also formed in a region where the drain electrode and the gate electrode of the TFT overlap each other.

Although not shown clearly in the drawing, in the four masking step process as shown in FIG. 1, the width of the active layer interposed below the data bus line is wider than the width of the data bus line, so that the etchant may penetrate the data bus line along the active layer to thereby cause the data bus line to open.

To prevent the data bus line from opening, a predetermined groove is formed in the gate bus line, but in spite of the existence of the groove in the gate bus line, the stepped portion is still formed in the data bus line to cause the data bus line to open.

SUMMARY OF THE INVENTION

Accordingly, the present invention is directed to a pixel structure of a liquid crystal display that substantially obviates one or more problems due to limitations and disadvantages of the related art.

It is an advantage of the present invention to provide a pixel structure of a liquid crystal display capable of preventing the data bus line from opening due to the stepped portion in an overlapping area of the data bus line and the gate bus line on the array substrate and also preventing the drain electrode from opening due to the stepped portion between the drain electrode and the gate electrode.

Additional advantages and features of the invention will be set forth in part in the description which follows and in part will become apparent to those having ordinary skill in the art upon examination of the following or may be learned from practice of the invention. The advantages of the invention may be realized and attained by the structure particularly pointed out in the written description and claims hereof as well as the appended drawings.

To achieve these advantages and in accordance with the purpose of the invention, as embodied and broadly described herein, there is provided a liquid crystal display comprising: a second substrate comprising; a TFT; a data bus line carrying a data signal that is applied to the TFT to drive unit pixels; and a gate bus line in which a bump-shaped groove is formed at a region where the gate bus line crosses and overlaps the data bus line to prevent the data bus line from opening and through which a gate signal is applied: wherein current is selectively supplied to the pixel electrode of the unit pixel region defined by the gate bus line and the data bus line so that an electric field is generated between the first substrate and the second substrate; and a liquid crystal layer between the first substrate and the second substrate.

In an aspect of the present invention, there is provided a pixel structure of a liquid crystal display comprising: a TFT in a unit pixel region; a data bus line; and a gate bus line perpendicularly crossing the data bus line to define a unit pixel region and the gate bus line having an area with a bump structure where the gate bus line overlaps the data bus line.

In another aspect of the present invention, there is provided a pixel structure of a liquid crystal display comprising: a plurality of first bus lines which are formed on a substrate of the liquid crystal display so as to define a unit pixel region and through which a signal is applied; and a second bus line formed before the first bus lines are formed, and having an edge overlapped with the first bus line and shaped in a non-linear structure so that the first bus line is prevented from opening.

According to the present invention, the structures of the gate electrode and the gate bus line are modified at the stepped portion where the gate bus line and the data bus line arranged on the array substrate are overlapped with each other so that data and source/drain are prevented from opening.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
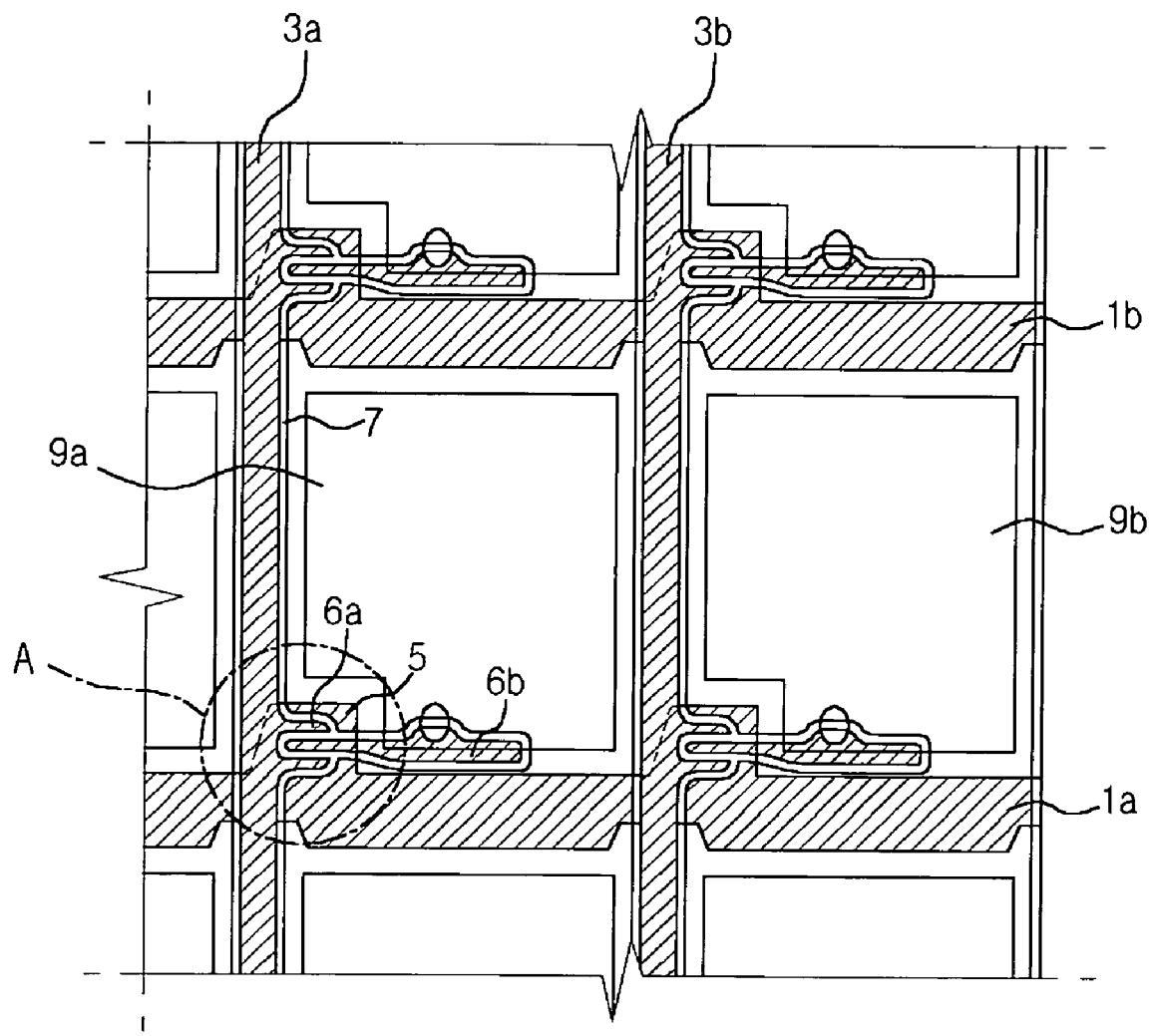
FIG. 1 is plan view of a structure of an array substrate of an LCD according to the related art.
Figure 2:
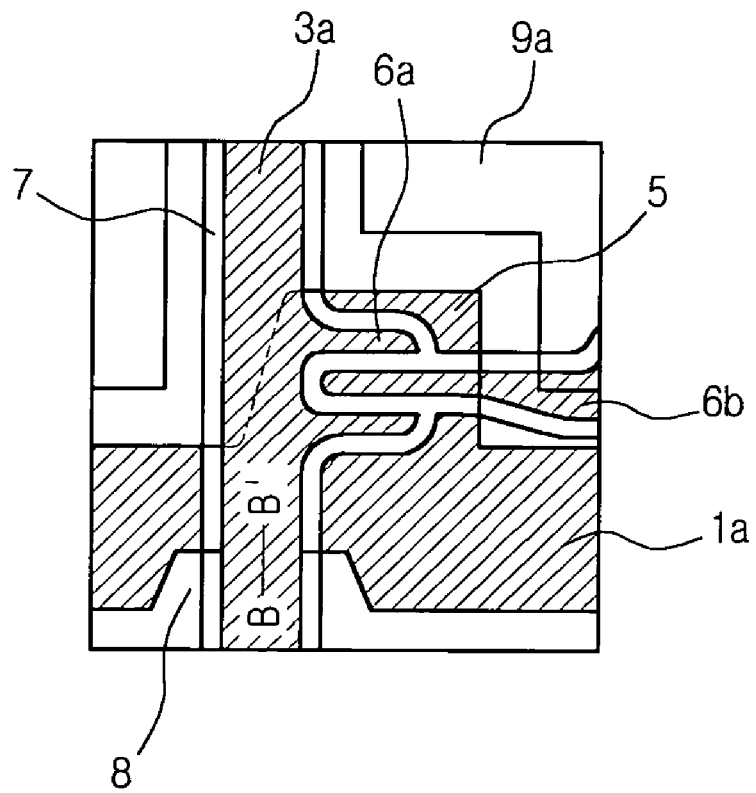
FIG. 2 is an enlarged view of a cross region of the data bus line and the gate bus line shown in FIG. 1.
Figure 3:
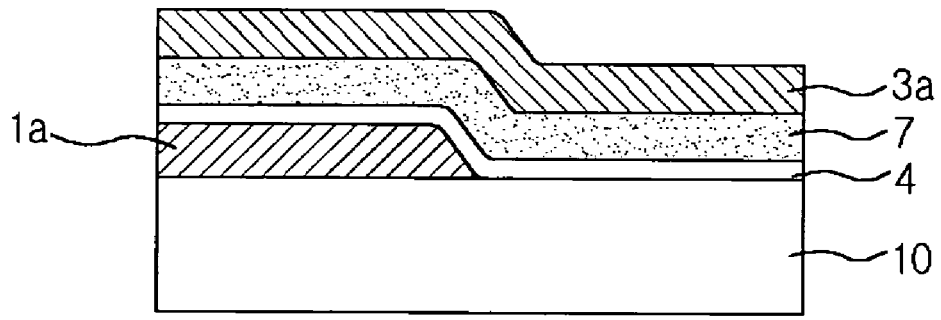
FIG. 3 is a cross-sectional view taken along the line B–B' of FIG. 2.
Figure 4:
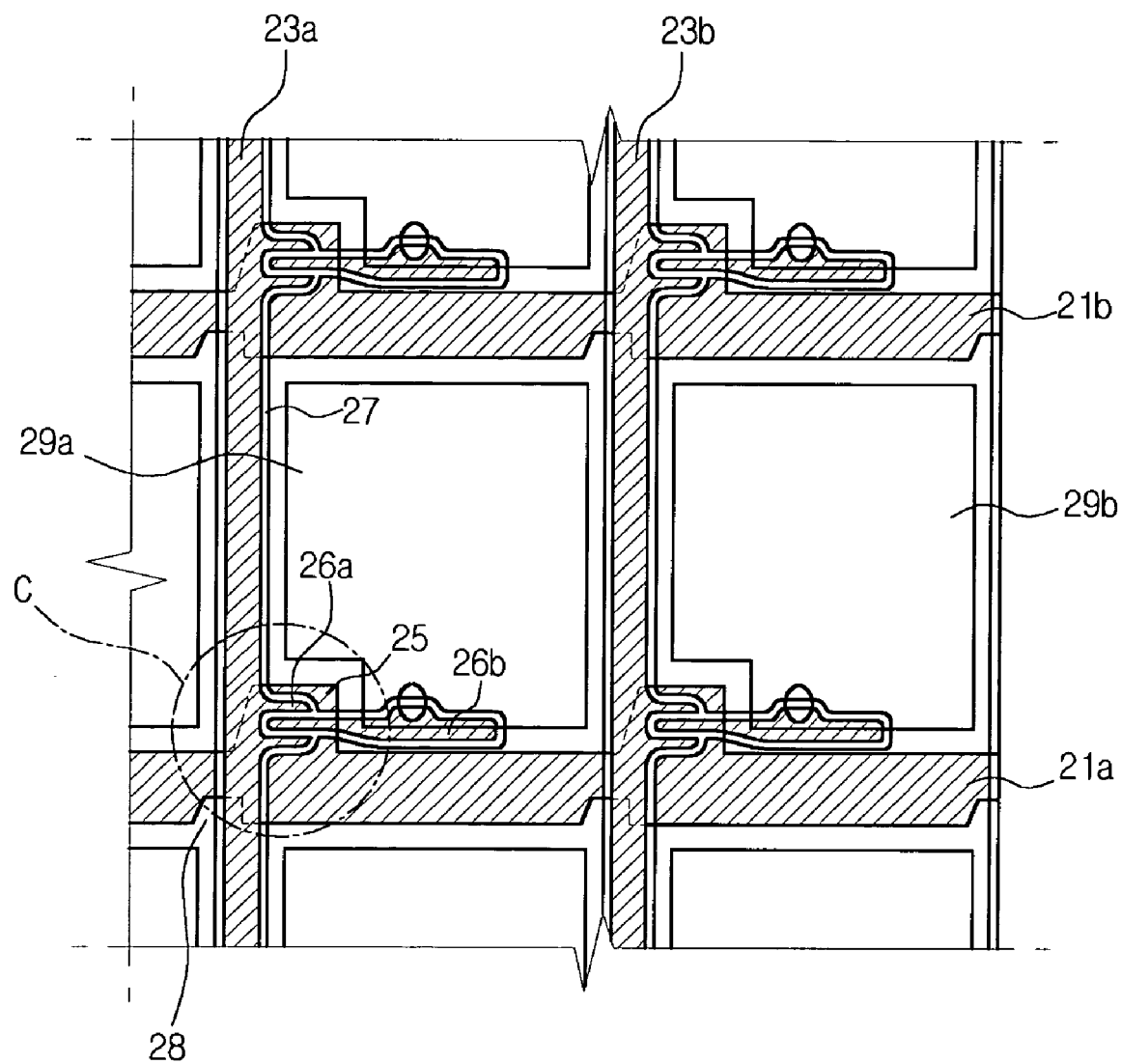
FIG. 4 illustrates a structure of an array substrate of an LCD according to the present invention.

FIG. 4 illustrates a structure of an array substrate of an LCD according to an embodiment of the present invention.

As shown in FIG. 4, a plurality of gate bus lines 21a and 21b and a plurality of data bus lines 23a and 23b cross substantially perpendicularly to each other to define unit pixel regions on a transparent insulating substrate.

The unit regions have TFTs that are a switching element and pixel electrodes 29a and 29b made of transparent Indium-Tin-Oxide (ITO) metal.

On the gate bus line 21a, a gate insulating film and an active layer 27 are formed. On the active layer 27, the data bus line 23a, a source electrode 26a and a drain electrode 26b are formed. The active layer 27 consists of an amorphous silicon film and n+ amorphous silicon film to form a channel layer and an ohmic contact layer.

After the data bus lines 23a and 23b, the source electrode 26a and the drain electrode 26b are formed, a passivation film is deposited thereon to protect the elements formed on the array substrate. A contact hole is formed in the passivation film so as to electrically connect the drain electrode 26b and the pixel electrodes 29a and 29b. After the formation of the contact hole, the pixel electrodes 29a and 29b are electrically connected with the drain electrode 26b through the contact hole.

In the structure of the array substrate as shown in FIG. 4, the active layer 27 extends by a predetermined distance on both sides of the data bus line 23a and 23b. This is because the source and drain electrodes 26a and 26b and a channel layer are simultaneously formed in the four masking step process.

In the four masking step process and the five masking step process, the gate insulating film and the active layer 27 are interposed between the gate electrode 25 and the drain electrode 26b. Likewise, the gate insulating film and the active layer are interposed between the gate bus line 21a and the data bus line 23a, so that a stepped portion is formed.

In the present invention, to prevent the data bus line 23a and the drain electrode 26a from opening due to the stepped portion of the gate electrode 25 and the gate bus line 21a, groove structures 28 of the gate electrode 25 and the gate bus line 21a are changed so as to expand the region where the data bus line 23a and the drain electrode 26b are overlapped with each other.

The gate bus line 21a has a bump-shaped groove 28. The bump-shaped groove 28 overlaps the data bus line 23a to be wide at some portion to be narrow at another portion.

In the other words, at the wide overlapping portion, the groove 28 of the gate bus line 21a is the same in width as the gate bus line, whereas at the narrow overlapping portion, the groove 28 is narrower in width than the gate bus line.

Therefore, when a metal layer for source and drain electrodes and data bus line is deposited, the metal layer is formed along the bump-shaped groove 28 formed on the gate bus line 21a and the data bus line 25 throughout a wider area with a blunt slope.

Accordingly, the metal layer is more firmly deposited at the area where the drain electrode 26b and the data bus line 23 overlap the gate electrode 25 and the gate bus line 21a, so that occurrences of the data bus line 23a opening can be prevented with sufficient reliability.

Figure 5:
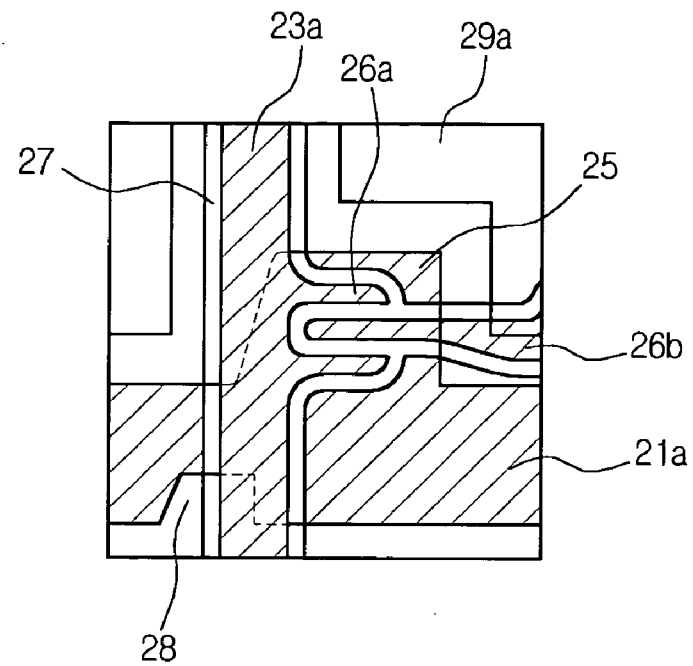
FIG. 5 illustrates the region where the data bus line and the gate bus line cross according to the present invention.

FIG. 5 illustrates a cross region (C) of the data bus line and the gate bus line according to the present invention.

As shown in FIG. 5, the data bus line 23a is formed on the bump-shaped groove 28 formed in the gate bus line 21a. In more detail, in the bump-shaped groove 28 of the gate bus line 21a, the half of the width of the overlapped data bus line 23a is the same as that of the gate bus line 21a while the other half of the width of the overlapped data bus line 23a is narrower than that of the gate bus line 21a.

Accordingly, while the metal for forming the data bus line 23a is deposited so as to correspond to the bump-shaped groove 28 of the gate bus line 21a, the metal is deposited along the wide region and narrow region of the bump-shaped groove 28.

Because stepped portions are generated at the different positions along the groove at the area where the data bus line 23a and the gate bus line 21a are overlapped with each other, in other words, because the stepped portions are generated at the wide region of the bump-shaped groove 28 and the narrow region of the bump-shaped groove 28, the metal is deposited overlapping along the wide region of the bump-shaped groove 28 as a result.

While the metal is deposited, the stepped portion is generated at a longer and wider portion along the line of the bump-shaped groove 28. Also, because the metal is deposited in a smooth line without abrupt bending along the line of the bump-shaped groove, the occurring rate of the opening is reduced more than in the case of the related art linear stepped portion.

In the present invention, the area of the data bus line 23a overlapping the gate bus line 21a perpendicularly is expanded, so that the data bus line 23a overlapped with the gate bus line 21a perpendicularly may be prevented from opening at the stepped portion. Thus, The slope of the data bus line metal deposited along the stepped portion according to the expanded gate area is made smooth, so that the data bus line 23a maybe prevented from opening.

Because the active layer 27 interposed between the data bus line 23a and the gate bus line 21a is wider than the data bus line 23a, in the four masking step process, etchant may penetrate a space between the data bus line 23a and the active layer 27 to cause the data bus line to open. However, like the present invention, the area of the gate bus line overlapped with the data bus line 23a is enlarged to prevent the etchant from penetrating.

Figure 6:
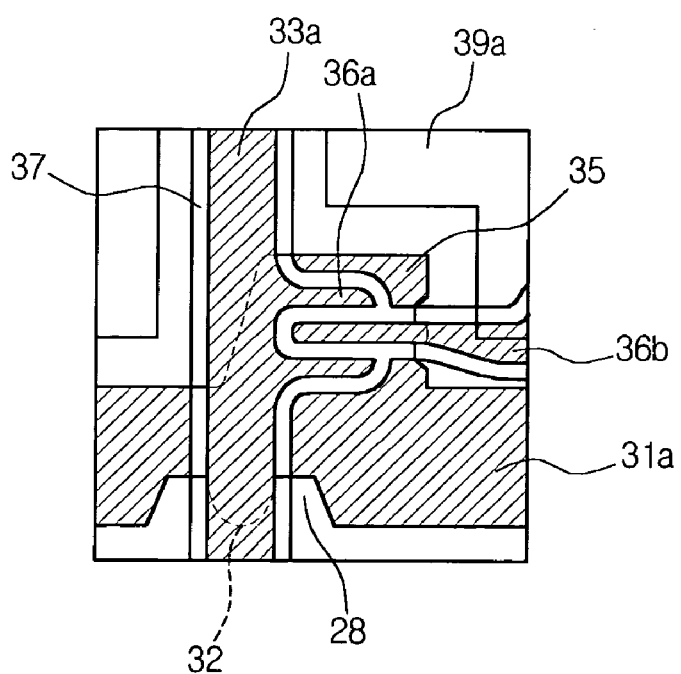
FIG. 6 illustrates a structure of a gate electrode and a gate bus line according to another embodiment of the present invention.

FIG. 6 illustrates the structure of a gate electrode and a gate bus line according to second embodiment of the present invention.

Referring to FIG. 6, the gate bus line 31a and the data bus line 33a cross perpendicularly to define a unit pixel. A pixel electrode 39a is arranged on the unit pixel region to form an array substrate. Another bump-shaped groove 38 that is different from that of the first embodiment is shown in the area where the gate bus line 31a and the data bus line 33a cross each other.

In the first embodiment, the single bump-shaped groove 28 is formed in the gate bus line 31a overlapped with the data bus line 33a. However, in the second embodiment, a bump-shaped protrusion 32 is longest and extends as wide as the gate bus line 31a at the center of the overlapped data bus line 33a, and narrows smoothly towards both ends. The width of the protrusion is almost the same as width of the data bus line 33a. By doing so, the opening of the data bus line may be prevented.

The gate bus line 31a extending away from the protrusion is structured in that grooves smaller than the width of the gate bus line 31a are formed on both sides of the gate bus line 31a.

As described in detail referring to FIG. 5, because the metal for the data bus line 33a is deposited along the protrusion, the metal has a blunt slope along the side of the protrusion overlapped with the both edges of the data bus line 33a, so that the likelihood of the data bus line 33a opening is reduced.

Figure 7:
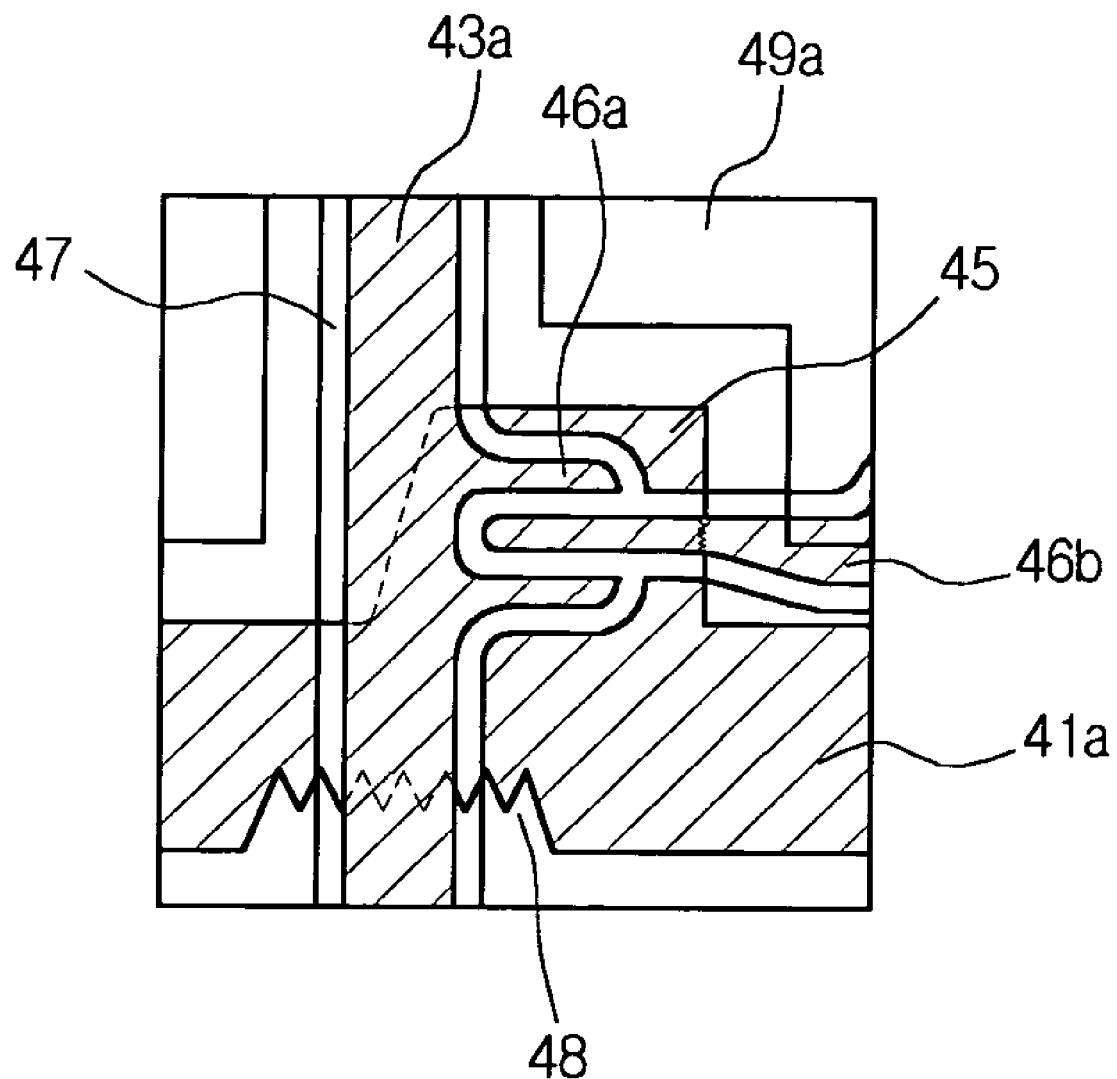
FIG. 7 illustrates another embodiment of the present invention.

FIG. 7 illustrates third embodiment of the present invention. As shown in FIG. 7, the gate bus line 41a and the data bus line 43a cross each other perpendicularly to define a unit pixel region. At the crossing region of the gate bus line 41a and the data bus line 43a, a TFT that is a switching element is formed. The TFT includes a gate electrode 45 integrated with the gate bus line 41a, a source electrode 46a integrated with the data bus line 43a, a drain electrode 46b formed corresponding to the source electrode 46a. The drain electrode 46a is electrically in contact with the pixel electrode 49a arranged on the pixel region. A signal applied to the data bus line 43a is transmitted to the pixel electrode 49a through the channel layer.

Because a metal film for the data bus line 43a and the drain electrode 46b is deposited above and overlapped with the gate bus line 41a and the gate electrode 45 with a stepped portion, the data bus line 43a and the drain electrode 46b may open while they are patterned and etched.

To prevent this opening, the gate electrode 45 overlapped with the drain electrode 46b is formed to be saw tooth-shaped 48 so that the overlapping area of the drain electrode 46b is enlarged. Likewise, the gate bus line overlapped with the data bus line 43a is formed to be saw tooth-shaped 48 so that the overlapping area of the data bus line 43a is enlarged.

The apexes of the saw tooth shaped gate electrode 45 are formed to be parallel with the line of the edge of the gate electrode 45 and the number of the apexes of the saw tooth shape is at least two.

The apexes of the saw tooth-shaped 48 gate bus line 41a overlapped with the data bus line 43a are formed to be narrower than the average width of the gate electrode 45. The apexes of the saw tooth shape can be formed horizontally.

Because the apexes of the saw tooth shape 48 formed in the gate electrode 45 and the gate bus line 41a enlarge the overlapping area of the data bus line 43a, the area acts as a buffer when the metal of the data bus line 43a is deposited, so that the drain electrode 46b and the data bus line 43a are prevented from opening.

In the four masking step process, the active layer interposed between the data bus line 43a and the gate bus line 41a, and the active layer interposed between the drain electrode 46b and the gate electrode 41a are formed wider than the data bus line 43a and the drain electrode 46b. Because of this structure, etchant may easily penetrate a space between the data bus line 43a and the active layer 45 and a space between the gate electrode 41a and the active layer 45, so that an opening of the data bus line 43a and the drain electrode 46b is caused. Also, the areas of the gate electrode 45 and the data bus line 43a overlapping the drain electrode 46b and the gate bus line 41a are widened to have the saw tooth-shape, so that they may be prevented from opening due to etchant penetration.

In the present invention, the data bus line formed on the gate bus line and the drain electrodes have predetermined stepped portions due to the gate insulating film and active layer. In the etching processes of an active layer, a passivation film, and a pixel electrode, the etchant is prevented from penetrating spaces therebetween so as to cause an opening. In other words, the data bus line, the gate electrode overlapping the drain electrode, and the gate bus line are enlarged so that the metal film is deposited with a blunt slope in spite of the stepped portion to prevent them from opening. Because the metal film is deposited with a blunt slope to prevent the etchant from penetrating, the invention can prevent the data bus line from opening due to the etchant.

As described above in detail, in the present invention, the shapes of the gate electrode and the gate bus line are changed at the stepped portion where the gate bus line and the data bus line overlap with each other on the array substrate, so that the data and the source and drain electrodes are prevented from opening.

In addition, because the structures of the gate electrode and the gate bus line are modified such that the data bus line are formed with a blunt slope, data bus line opening failures due to the etchant penetration or stepped portion can be prevented.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display comprising:
   a first substrate with red, green and blue color filters;
   a second substrate comprising;
   a TFT;
   a data bus line carrying a data signal that is applied to the TFT to drive unit pixels; and
   a gate bus line in which a bump-shaped groove is formed at a region where the gate bus line crosses and overlaps the data bus line to prevent the data bus line from opening and through which a gate signal is applied:
   wherein current is selectively supplied to the pixel electrode of the unit pixel region defined by the gate bus line and the data bus line so that an electric field is generated between the first substrate and the second substrate; and
   a liquid crystal layer between the first substrate and the second substrate,
   wherein the bump-shaped groove comprises a first portion which is as wide as width of the gate bus line and a second portion which is narrower than the width of the gate bus line.

2. The liquid crystal display according to claim 1, wherein the bump-shaped groove has an edge that overlaps the data bus line near the center of the data bus line.

3. The liquid crystal display according to claim 1, wherein the bump-shaped groove has a saw tooth-shaped portion.

4. The liquid crystal display according to claim 1, wherein the bump-shaped groove is saw tooth-shaped and generally parallel with the gate bus line.

5. The liquid crystal display according to claim 1, wherein the bump-shaped groove is saw tooth-shaped and narrower than the gate bus line on average.

6. The liquid crystal display according to claim 1, wherein the bump-shaped groove is formed to be saw tooth-shaped in a groove and narrower than the gate bus line.

7. A liquid crystal display comprising:
a first substrate with red, green and blue color filters;
a second substrate comprising;
- a TFT;
- a source electrode and a drain electrode formed on an active layer;
- a data bus line carrying a data signal that is applied to the TFT to drive unit pixels; and
- a gate bus line in which a bump-shaped groove is formed at a region where the gate bus line crosses and overlaps the data bus line to prevent the data bus line from opening and through which a gate signal is applied:
- wherein current is selectively supplied to the pixel electrode of the unit pixel region defined by the gate bus line and the data bus line so that an electric field is generated between the first substrate and the second substrate; and
- a liquid crystal layer between the first substrate and the second substrate, wherein the bump-shaped groove comprises a first portion which is as wide as width of the gate bus line and a second portion which is narrower than the width of the gate bus line.

* * * * *